US011619552B2

(12) United States Patent
Forbes et al.

(10) Patent No.: US 11,619,552 B2
(45) Date of Patent: Apr. 4, 2023

(54) CONDUIT TEMPERATURE MONITORING SYSTEM

(71) Applicant: CONTROLS SOUTHEAST, INC., Charlotte, NC (US)

(72) Inventors: Brandon William Forbes, Charlotte, NC (US); Carl Richard Barrington, III, Charlotte, NC (US)

(73) Assignee: CONTROLS SOUTHEAST, INC., Pineville, NC (US)

( * ) Notice: Subject to any disclaimer, the term of this patent is extended or adjusted under 35 U.S.C. 154(b) by 225 days.

(21) Appl. No.: 17/081,825

(22) Filed: Oct. 27, 2020

(65) Prior Publication Data

US 2021/0148769 A1    May 20, 2021

Related U.S. Application Data

(60) Provisional application No. 62/926,904, filed on Oct. 28, 2019, provisional application No. 62/966,368, filed on Jan. 27, 2020.

(51) Int. Cl.
*G01K 11/32* (2021.01)
*G01F 1/698* (2006.01)
*G01K 15/00* (2006.01)

(52) U.S. Cl.
CPC .............. *G01K 11/32* (2013.01); *G01F 1/698* (2013.01); *G01K 15/002* (2013.01)

(58) Field of Classification Search
CPC ....... G01K 11/32; G01K 15/002; G01F 1/698
(Continued)

(56) References Cited

U.S. PATENT DOCUMENTS

| 4,417,782 A | 11/1983 | Clarke et al. |
| 5,499,313 A | 3/1996 | Kleinerman |

(Continued)

FOREIGN PATENT DOCUMENTS

| CN | 2453215 Y * | 1/2001 |
| CN | 2809618 | 8/2006 |

(Continued)

OTHER PUBLICATIONS

Raychem-SB-H58631 Sulfur Transport Pipelines. Safe, Reliable and Cost Effective Heat Management System. www.pentair.thermal.com.

(Continued)

*Primary Examiner* — Gail Kaplan Verbitsky
(74) *Attorney, Agent, or Firm* — Moore & Van Allen PLLC; Jeffrey R. Gray

(57) ABSTRACT

A temperature monitoring system for accurate and real-time temperature monitoring may be employed at a conduit and/or a temperature control element. The conduit is configured to transport a fluid along the length of the conduit, and the conduit may comprise a variety of conduit structures having numerous cross-sections, shapes, orientation, geometry, operating conditions, operation functions, etc. The temperature control element operatively coupled to the conduit may be utilized to control the temperature of the fluid within the conduit. Typically, the temperature control element is configured to heat or cool the fluid within the conduit. The temperature monitoring system may further comprise one or more temperature sensors, such as distributed temperature sensor(s) or discrete temperature sensor(s), operatively coupled to the conduit and/or the temperature control element. The temperature sensor(s) are configured to capture temperature readings at one or more locations along the length of the conduit or the temperature control element.

17 Claims, 12 Drawing Sheets

(58) Field of Classification Search
USPC ............ 374/1, 121, 130, 131, 137, 147, 148
See application file for complete search history.

(56) References Cited

U.S. PATENT DOCUMENTS

| | | | | |
|---|---|---|---|---|
| 5,785,425 | A * | 7/1998 | Buchanan | G01N 33/28 374/25 |
| 5,991,479 | A | 11/1999 | Kleinerman | |
| 6,547,435 | B1 | 4/2003 | Grosswig et al. | |
| 6,558,036 | B2 | 5/2003 | Gysling et al. | |
| 6,644,848 | B1 * | 11/2003 | Clayton | E21B 43/01 73/61.62 |
| 7,430,903 | B2 | 10/2008 | Ramos | |
| 7,726,876 | B2 * | 6/2010 | Laverdiere | G01J 5/02 374/208 |
| 8,360,635 | B2 * | 1/2013 | Huang | G01N 33/2823 374/29 |
| 8,985,154 | B2 | 3/2015 | Quigley et al. | |
| 9,759,632 | B2 * | 9/2017 | Trescott | G01F 1/6888 |
| 2004/0047395 | A1 * | 3/2004 | Xie | G01J 5/0887 374/139 |
| 2008/0134751 | A1 * | 6/2008 | Huang | G01N 29/222 73/23.2 |
| 2008/0205481 | A1 * | 8/2008 | Faries | G01K 1/146 374/138 |
| 2009/0064663 | A1 * | 3/2009 | Ma | F02D 41/1446 374/163 |
| 2010/0170483 | A1 * | 7/2010 | Wienand | G01F 1/692 73/23.31 |
| 2018/0202871 | A1 * | 7/2018 | Son | G01K 7/427 |
| 2019/0250045 | A1 | 8/2019 | Gleason | |
| 2019/0360628 | A1 * | 11/2019 | Corneil | F22B 1/285 |

FOREIGN PATENT DOCUMENTS

| | | | | |
|---|---|---|---|---|
| CN | 107238477 | A * | 10/2017 | |
| CN | 107541810 | A * | 1/2018 | |
| FR | 2484088 | A * | 12/1981 | G01K 17/04 |
| JP | H326389 | Y2 * | 6/1991 | |
| JP | 28933294 | | 11/1994 | |

OTHER PUBLICATIONS

P. Rajeev et al. Distributed Optical Fibre Sensors and Their Applications in Pipeline Monitoring. Key Engineering Materials. vol. 558 (2013) pp. 424-434 (c) (2013) Trans Tech Publications, Switzerland doi: 10,4028/www.scientific.net/KEM.558.424.

Daniele Inaudi and Branko Glisic. Long Range Pipeline Monitoring by Distributed Fiber Optic Sensing. Journal of Pressure Vessel Technology. Feb. 2010. vol. 132. pp. 011701-1 through 011701-9.

* cited by examiner

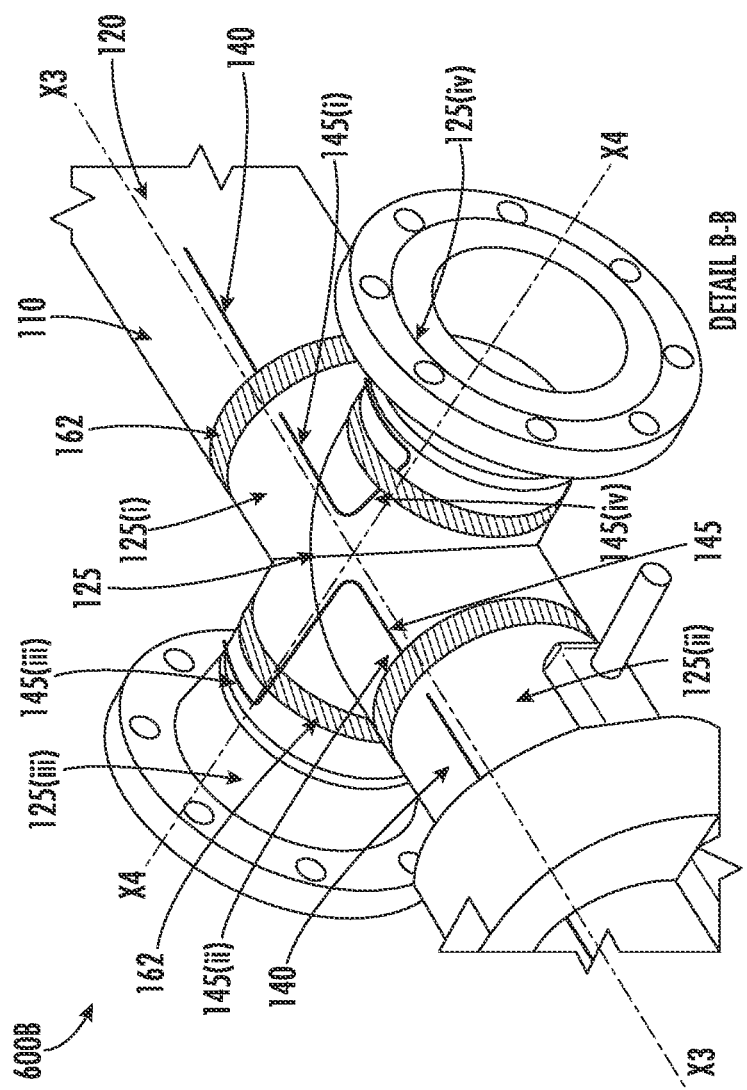

CONDUIT TEMPERATURE MONITORING SYSTEM

CROSS REFERENCE AND PRIORITY CLAIM UNDER 35 U.S.C. § 119

The present Application for a Patent claims priority to U.S. Provisional Patent Application Ser. No. 62/926,904 entitled "Conduit Temperature Monitoring System," filed on Oct. 28, 2019 and U.S. Provisional Patent Application Ser. No. 62/966,368 entitled "Conduit Temperature Monitoring System," filed on Jan. 27, 2020, both of which are assigned to the assignees hereof and hereby expressly incorporated by reference herein.

FIELD

The present invention generally relates to a temperature monitoring system structured for accurate, and real-time temperature monitoring, assessment and/or regulation of fluid conduits and/or temperature control elements coupled to the fluid conduits. In particular, the temperature monitoring system of the present invention is structured for temperature monitoring and/or control of a fluid conduit (e.g., a pipe) and/or a temperature control element (e.g., a tracer system) for the fluid conduit.

BACKGROUND

Pipes, and pipe systems, are widely used for innumerable functions, such as, for example, transporting fluids. It is often desirable to maintain a fluid transported via a pipe system at a predetermined temperature range in order to maintain the fluid in a liquid form (e.g., above an ambient temperature of an environment in which the pipe is located, or the like).

BRIEF SUMMARY

The present invention addresses the foregoing deficiencies of conventional systems and provides other advantages by providing a comprehensive temperature monitoring system structured for accurate, real-time, and continuous temperature monitoring and assessment of conduits (e.g., process conduits, conduit structures, and/or process fluids) and/or temperature control elements (e.g., tracer tubes, tube structures, and/or control fluid). The comprehensive temperature monitoring system of the present invention can be easily assembled with existing conduit systems, without requiring disassembly of the conduit system. In some embodiments, the temperature monitoring system of the present invention can be removably assembled with conduit systems, without altering or damaging the conduit systems. In some embodiments, the temperature monitoring system is a distributed temperature sensing system that is able to provide comprehensive temperature measurements throughout the extent of the conduit system or temperature control system. For instance, a fiber optic cable can be wrapped along and/or around different locations along the length of a pipe, as will be described in detail later on. In other embodiments, the temperature monitoring system is a discrete temperature sensing system with one or more discrete temperature sensors that are able to provide temperature measurements at one or more discrete locations along the length of a pipe, as will be described in detail herein. The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

The invention provides systems, apparatuses and methods for a temperature monitoring system. In particular, in some embodiments of the invention, a temperature monitoring system is provided. Typically, the temperature monitoring system comprises a conduit configured to transport a fluid, such as along a length of the conduit. Typically, the conduit comprises a length greater than a width. Moreover, the temperature monitoring system further comprises a temperature control element operatively coupled to the conduit. The temperature control element is configured to heat or cool the fluid within the conduit. Moreover, the temperature monitoring system further comprises a fiberoptic cable and/or one or more discrete temperature sensors operatively coupled to the conduit or the temperature control element. The fiberoptic cable and/or one or more discrete temperature sensors are configured to capture temperature readings at a plurality of locations along the length of the conduit or the temperature control element.

Embodiments of the invention comprise a temperature monitoring system. The temperature monitoring system comprises a conduit having a length greater than a width and configured to transport a conduit fluid along the length of the conduit. The system further comprises a temperature control element operatively coupled to the conduit and configured to heat or cool the conduit fluid within the conduit. One or more temperature sensors are operatively coupled to the conduit or the temperature control element and are configured to capture temperature readings at one or more locations of the conduit or the temperature control element.

In further accord with embodiments, the one or more temperature sensors comprise one or more discrete temperature sensors operatively coupled to one or more locations of the conduit.

In other embodiments, the one or more temperature sensors comprise one or more discrete temperature sensors operatively coupled to one or more locations of the temperature control element.

In yet other embodiments, the one or more discrete temperature sensors are operatively coupled to a fitting at the one or more locations of the temperature control element.

In still other embodiments, the one or more temperature sensors comprise one or more distributed temperature sensors comprising a fiberoptic cable operatively coupled to the conduit or the temperature control element. The fiberoptic cable is configured to capture temperature readings at a plurality of locations along the length of the conduit or the temperature control element.

In other embodiments, the fiberoptic cable is operatively coupled to the conduit.

In yet other embodiments, the fiberoptic cable is operatively coupled to the temperature control element.

In further accord with embodiments, the temperature control element comprises a temperature control conduit comprising a control fluid of a temperature greater than or less than the conduit fluid of the conduit to supply or extract heat from the conduit fluid of the conduit.

In other embodiments, the temperature control element comprises an electric heater that utilizes electrical resistance to supply heat.

In still other embodiments, the temperature control element comprises a jacketed pipe, a heat exchanger, or a tracer tube.

In yet other embodiments, the conduit fluid comprises a process fluid that is being heated by the temperature control element.

In further accord with embodiments, the conduit, the temperature control element, and the one or more temperature sensors are at least partially covered by insulation.

In other embodiments, the temperature monitoring system further comprises a controller operatively coupled to the one or more temperature sensors. The controller comprises one or more communication components, one or more memory components having computer readable code stored thereon, and one or more processing components operatively coupled to the one or more memory components and the one or more communication components. The one or more processing components are configured to execute the computer readable code to receive one or more signals from the one or more temperature sensors, and provide output through the one or more communication components regarding the one or more signals received from the one or more temperature sensors. The output comprises at least one of the temperature readings.

In still other embodiments, the output comprises the temperature readings at the one or more locations of the conduit or the temperature control element.

In further accord with some embodiments, the output is a visual representation of the conduit or the temperature control element with the temperature readings at the one or more locations of the conduit or the temperature control element.

In other embodiments, the output is an alert indicating when the at least one of the temperature readings meets or fails to meet a threshold temperature value.

Other embodiments of the invention comprise a method of monitoring a temperature of a conduit fluid or a control fluid. The method comprises receiving a plurality of temperatures from a plurality of locations on a conduit or a temperature control element. The plurality of temperatures are received from one or more temperature sensors operatively coupled to the conduit or the temperature control element. The plurality of temperatures received approximate a conduit fluid temperature or a control fluid temperature. The plurality of temperatures at the plurality of locations are compared with stored threshold temperatures. Operation of the conduit fluid or the control fluid is adjusted based on the comparison of the plurality of temperatures at the plurality of locations with the stored threshold temperatures.

In further accord with embodiments, the one or more temperature sensors comprise one or more distributed temperature sensors or one or more discrete temperature sensors.

Another embodiment of the invention comprises a temperature monitoring system. The temperature monitoring system comprises one or more temperature sensors configured to be operatively coupled with a conduit configured to transport a conduit fluid or to be operatively coupled with a temperature control element operatively coupled to the conduit. The one or more temperature sensors are configured to capture temperature readings at a plurality of locations along the conduit or the temperature control element. The conduit is configured to transport the conduit fluid along a length of the conduit and the temperature control element is configured to heat or cool the conduit fluid within the conduit.

In other embodiments, the one or more temperature sensors comprise one or more distributed temperature sensors or one or more discrete temperature sensors.

To the accomplishment of the foregoing and the related ends, the one or more embodiments of the invention comprise the features hereinafter fully described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

The figures are for illustration purposes only and are not drawn to scale. The invention itself, however, both as to organization and method of operation, may best be understood by reference to the description of the embodiment(s), which follows, taken in conjunction with the accompanying drawings in which:

FIG. 6B illustrates a detail sectional view 600B of the temperature monitoring system 110 of FIG. 6A.

DETAILED DESCRIPTION OF THE INVENTION

Figure 1:
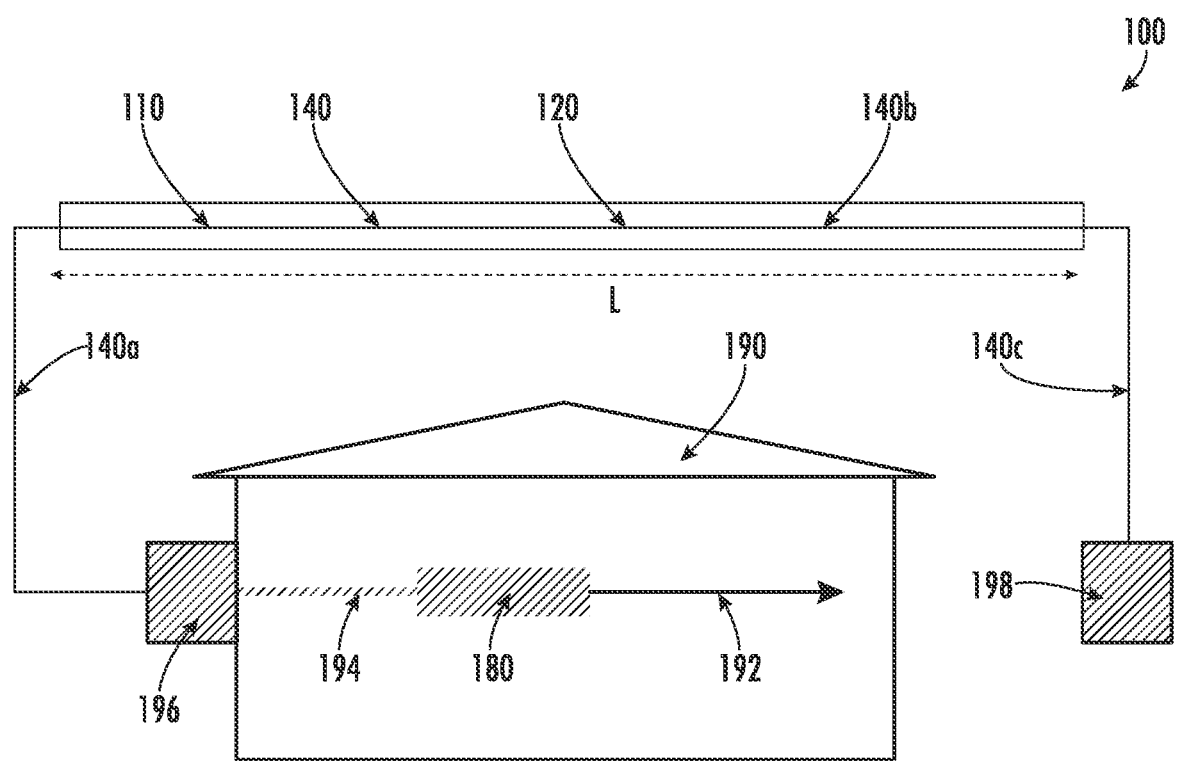
FIG. 1 illustrates a schematic depiction 100 of the temperature monitoring system 110, in accordance with some embodiments of the disclosure.

Embodiments of the present invention may now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In describing the embodiment(s) of the present invention, reference will be made herein to FIGS. 1 to 9 of the drawings in which like numerals refer to like features of the invention. Features of the invention are not necessarily shown to scale. In general, the present invention provides a comprehensive temperature monitoring system 110, that is structured for accurate and real-time temperature monitoring, temperature tracking (e.g., over a predetermined time period), temperature regulation and/or temperature control (i) of a conduit system 120 (also referred to as a conduit 120), such as the conduit fluid 2 being transported by the conduit system 120, and/or (ii) a temperature control element 130, such as control fluid within the temperature control element 130. The conduit 120 may comprise a pipe, a vessel, a valve, a drum, a tank, an instrument, or combinations of the pipe, the vessel, the valve, the drum, the tank, the instrument and/or the like. In some embodiments, a temperature control element 130 may be operatively coupled to the conduit 120, such that the temperature control element 130 is configured to heat or cool the conduit fluid 2 within the conduit 120 to a temperature within a predetermined temperature range. In some instances, the temperature control element 130 comprises a heating element 132, that is used to heat the conduit fluid within the conduit 120. One or more temperature sensors, such as one or more distributed temperature sensors (e.g., a fiberoptic cable 140, or the like) and/or one or more discrete temperature sensors (e.g., thermocouple, bi-metallic, expanding fluid, resistance temperature detector (RTD), or the like), may be utilized to determine temperatures continuously or at specific points of the conduit system 120, or the conduit fluid therein, and/or of the temperature control element 130, or the control fluid therein.

In some embodiments, a distributed temperature sensor 140, such as a fiberoptic cable, is operatively coupled to (e.g., attached to, either removably or fixedly) the conduit 120 (e.g., outer surface of the conduit 120) and/or to a temperature control element 130 (e.g., the heating element 132, or the like) that is operatively coupled to the conduit 120. The distributed temperature sensor 140 (e.g., the fiberoptic cable, or the like) is structured to capture temperature readings at a plurality of locations 150 along the length of the conduit 120 or the temperature control element 130 (e.g., the heating element 132, or the like), and provide periodic or continuous temperature measurements along at least a portion of the conduit (e.g., different sections or the entire length of the conduit 120 or the temperature control element 130. The distributed temperature sensor 140 (e.g., fiberoptic cable, or the like) may communicate with and/or be operated by a controller 180. Alternatively, or additionally, one or more discrete temperature sensors 1010 (e.g., thermocouple, bi-metallic, or the like) will be operatively coupled to the conduit 120 and/or to a temperature control element 130 at various discrete locations. The one or more discrete temperature sensors 1010 are configured to capture temperature readings at a plurality of locations 150 along the length of the conduit 120 or the temperature control element 130 (e.g., the heating element 132, or the like), and provide periodic or continuous temperature measurements along at least a portion of the conduit 120 or the temperature control element 130. The one or more discrete temperature sensors 1010 may communicate with and/or be operated by a controller 180.

Specifically, in some embodiments as illustrated by FIG. 1, the temperature monitoring system 110 comprises one or more fiber optic cables 140 operatively coupled to a conduit system 120 (or in other embodiments to a temperature control element 130 operatively coupled to the conduit 120). The temperature monitoring system 110 further comprises a controller 180 operatively coupled to the fiberoptic cable(s) 140, such that the controller 180 may (i) receive one or more fiberoptic signals from the fiberoptic cable(s) 140, and/or (ii) cause transmission of light (e.g., from a laser source) through the fiberoptic cable(s) 140. The controller 180 may be housed within an enclosure 190 (e.g., a climate-controlled dwelling/building). The controller 180 may be coupled to the fiberoptic cable(s) 140 at a first portion 140*a* of the fiberoptic cable(s) 140 via a splice box 196. The splice box 196 may comprise a grounding system. The controller 180 may receive one or more fiberoptic signals from the fiberoptic cable(s) 140 through the fiber optic data cable 194. The controller 180 may transmit output regarding the one or more fiberoptic signals received from the fiberoptic cable(s) 140 through a network cable 192. A second portion 140*b* of the fiber optic cable(s) 140 is operatively coupled to a conduit system 120, as illustrated (or to a temperature control element 130 operatively coupled to the conduit system 120). Moreover, the fiber optic cable(s) 140 may be coupled to a termination box 198 at a third portion 140*c* (e.g., a cable drop portion) of the fiber optic cable(s) 140. The termination box 198 may further comprise a grounding system.

Figure 2:
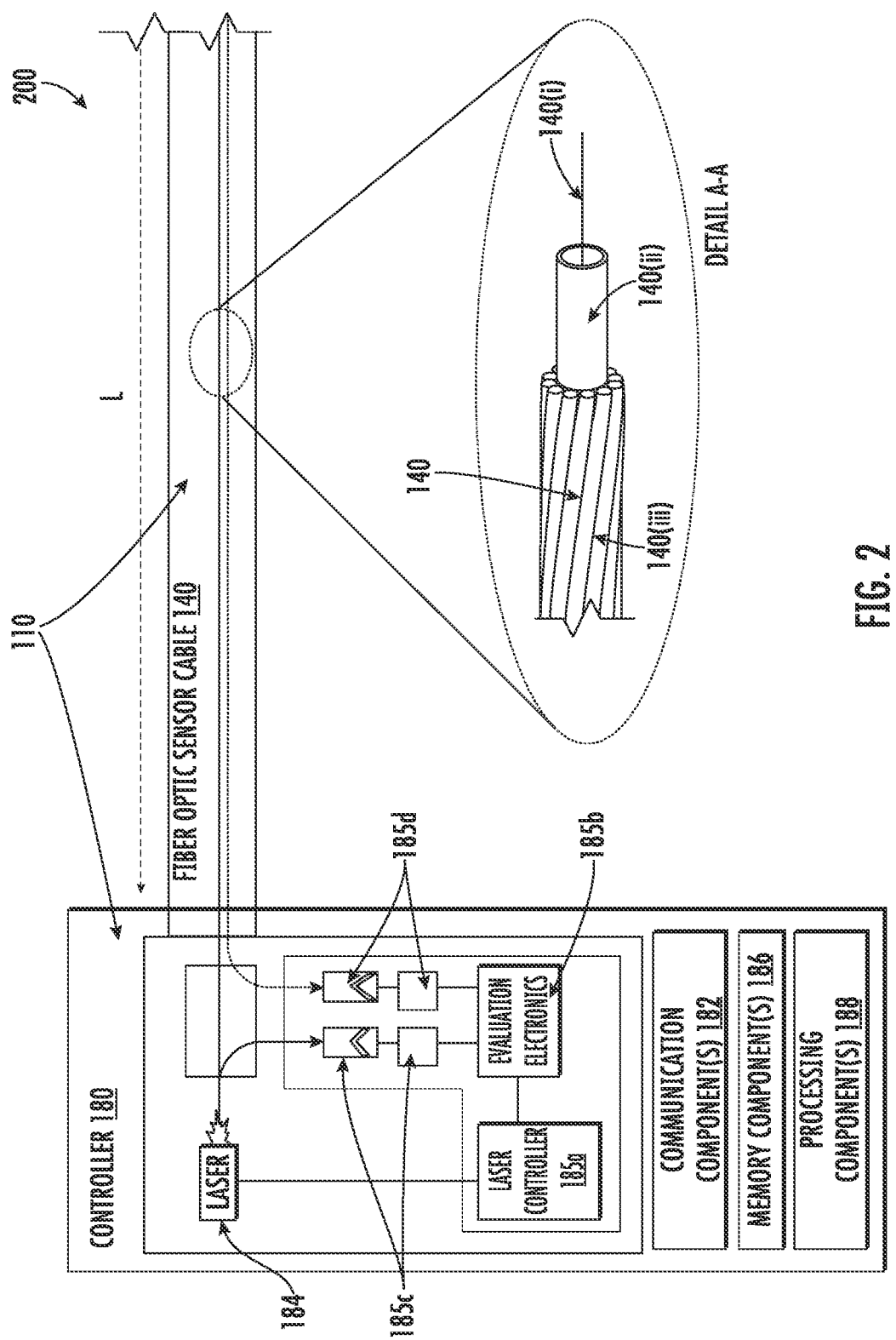
FIG. 2 illustrates a schematic sectional view 200 of a temperature monitoring system 110, in accordance with some embodiments of the disclosure.

FIG. 2 illustrates a schematic sectional view 200 of a temperature monitoring system 110, depicting the components of the controller 180 and the fiber optic cable(s) 140. The controller 180 comprises one or more communication components 182 structured for transmitting input signals (e.g., data, electronic signals, or the like) to the controller 180 from other components and transmitting output signals from the controller 180 from other components, via a network (e.g., wired or a wireless network). As such, the one or more communication components 182 generally comprise a modem, server, and/or other devices for communicating with other components of the temperature monitoring system 110. The network may be a system specific distributive network receiving and distributing specific network feeds. The network may also be a global area network (GAN), such as the Internet, a wide area network (WAN), a local area network (LAN), or any other type of network or combination of networks. The network may provide for wireline, wireless, or a combination wireline and wireless communication between devices on the network. In some embodiments, the network may enable communication between devices thorough near-field communication, transmission of electromagnetic waves, sound waves, light waves or any other suitable means.

The controller 180 may further comprise one or more memory components 186 having computer readable code stored thereon. The computer readable code may be associated with performing some or all temperature monitoring and control functions described herein and may be stored within a data storage (e.g., non-transitory computer readable medium) of one or more memory components 186.

Typically, the controller 180 further comprises one or more processing components 188 operatively coupled to the one or more memory components 186 and the one or more communication components 182. Executing the computer readable code is structured by the one or more processing components 188 is structured to cause the controller 180 to receive one or more fiberoptic signals from the fiberoptic cable 140 and process and analyze the same. The controller 180 may then transform the one or more fiberoptic signals into temperature values and then determine whether the temperature values meet a predetermined threshold temperature value (e.g., a threshold temperature range). Based on determining whether the temperature values meet a predetermined threshold temperature value, the controller 180 may provide output through the one or more communication components 182 regarding the one or more fiberoptic signals received form the fiberoptic cable 140. In some embodiments, the output may comprise at least one of the temperature readings of the plurality of locations 150 along the length of the conduit 120 or the heating element 130. In some embodiments, in response to determining that the temperature values fail to meet the predetermined threshold temperature value, the controller 180 may transmit the output comprising an alert indicating when the at least one of the temperature readings fail to meet a threshold temperature value, in real time (e.g., immediately or near real time, such as within seconds, or the like). In some embodiments, in response to determining that the temperature values meet the predetermined threshold temperature value, the controller 180 may transmit the output comprising a notification, alert, and/or a graphical display indicating when the at least one of the temperature readings fail to meet a threshold temperature value, in real time. In some embodiments, the controller 180 may transmit the output comprising a visual representation of the conduit 120 or the temperature control element 130 with the temperature readings (e.g., the visual representation illustrated by FIG. 3C, as will be described in further detail) at the plurality of locations 150 along the length of the conduit 120 or the temperature control element 130, which may be updated periodically or continuously in real time in response to temperature fluctuations.

The one or more processing components 188 may be also referred to as a processing device or processor, and generally include circuitry used for implementing the communication and/or logic functions of the temperature monitoring system 110. For example, the one or more processing components 188 may include a digital signal processor device, a microprocessor device, and various analog-to-digital converters, digital-to-analog converters, and other support circuits and/or combinations of the foregoing. The temperature monitoring system 110 may also comprise one or more user devices (not illustrated) such as mobile devices (e.g., a smartphone), computers (e.g., a laptop computer), etc., having display devices for displaying outputs from the controller 180.

Figure 3A:
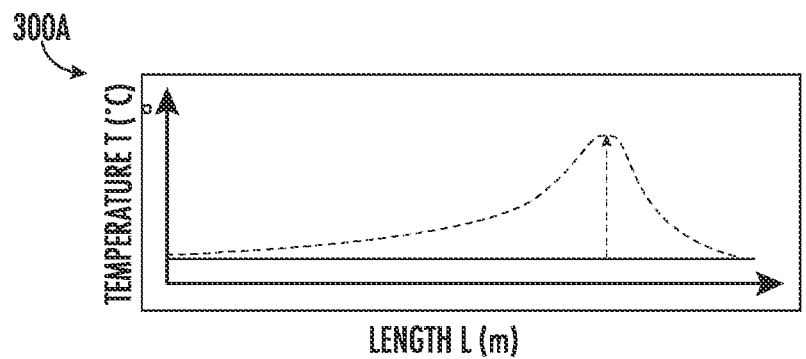
FIG. 3A illustrates a calculated temperature profile plot 300A, in accordance with some embodiments of the disclosure.

As further illustrated by FIG. 2, the controller 180 may further comprise (or may be operatively coupled to) a laser source 184. The processing component(s) 188 may transmit control signals to the laser source 184 via a laser controller 185a, to cause the laser source 184 to transmit light of a particular wavelength and/or intensity to the fiberoptic cable 140, to cease transmitting the light, or the like. The controller 180 may further comprise evaluation electronics 185b (e.g., that may be a part of the processing component(s) 188), which may be structured for receiving input signals to the fiberoptic cable 140 via input signal component 185c and receiving output signals from the fiberoptic cable 140 via output signal component 185d (e.g., from termination box 198 of FIG. 1). The evaluation electronics 185b may compare and analyze the input signals to the fiberoptic cable 140 (e.g., incident light from the laser source 184) and the output signals from the fiberoptic cable 140 (e.g., light exiting the fiberoptic cable 140), and transform the signal gradient into a temperature reading. As such, the controller 180 determines temperature(s) of the conduit fluid throughout the length L of the conduit system 120 (or the control fluid from the temperature control element 130) based on the light input to and output from the fiberoptic cable 140. FIG. 3A illustrates a non-limiting, illustrative example of a temperature profile plot 300A determined by the controller 180 at a given point in time.

Figure 3B:
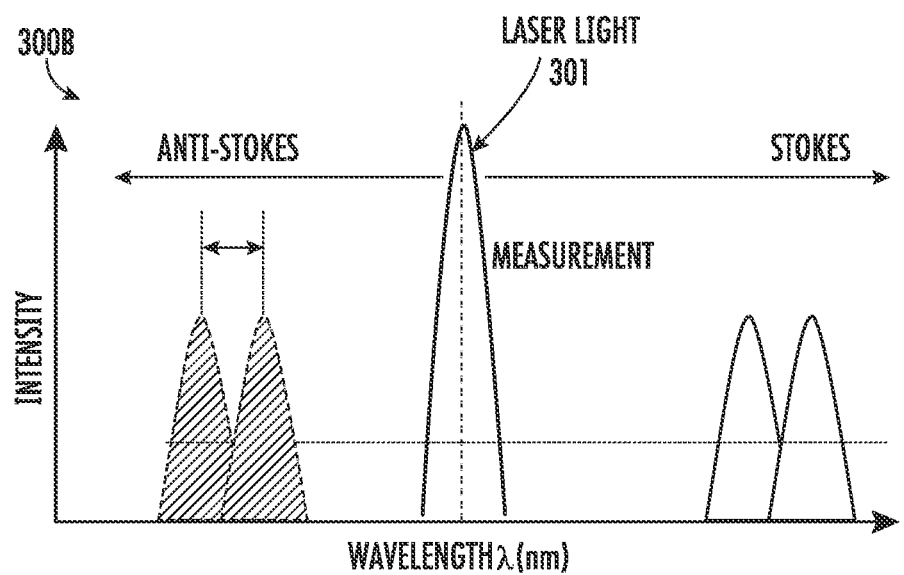
FIG. 3B illustrates a scattering profile plot 300B, in accordance with some embodiments of the disclosure.
Figure 3C:
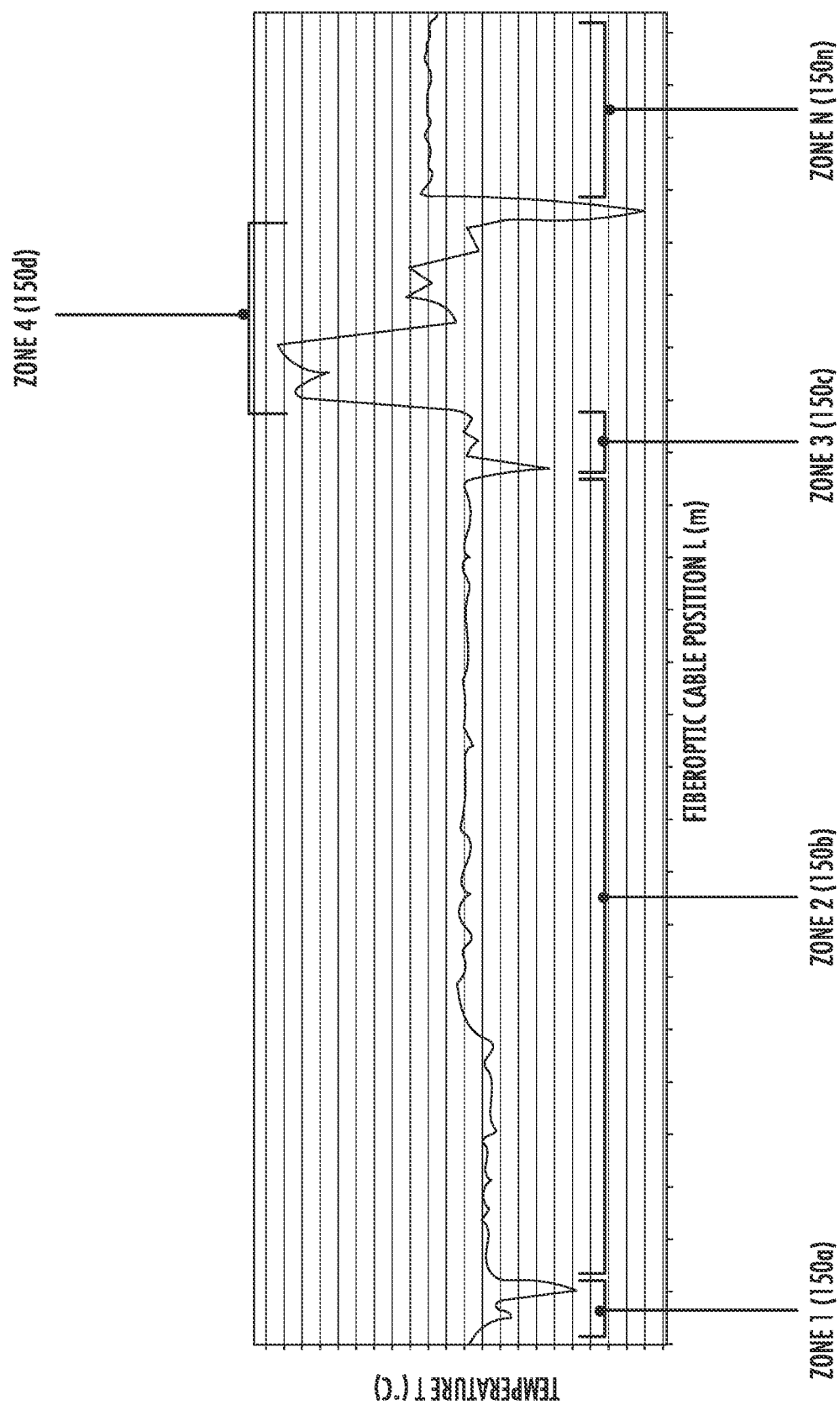
FIG. 3C illustrates a temperature plot 300C, in accordance with some embodiments of the disclosure.

The calculation of the temperature will be described in detail with reference to FIG. 2 and FIGS. 3B-3C. As discussed above, the fiberoptic cable 140 is operatively coupled to and in contact with a conduit system 120 (or a temperature control element 130) having a length L which typically transmits fluid therethrough. First, light 301 (e.g., at a wavelength λ of about 1550 nm) from the laser source 184 is transmitted to the fiberoptic cable 140. The light is then transmitted throughout the extent of the fiberoptic cable 140. The heat from the conduit system 120 (or the temperature control element 130) is structured to deform the microstructure of the adjacent portion of the fiberoptic cable 140. Different temperatures of the conduit system 120 (or the temperature control element 130) cause varying deformations of the microstructure of the fiberoptic cable 140. Specifically, in some instances, the temperature and strain subjected onto the fiberoptic cable 140 by the adjacent conduit system 120 portion (or the temperature control element 130 portion) is structured to cause a change in the refractive index and/or other properties of the adjacent fiberoptic cable 140. This results in change in frequency of the acoustic phonons of the light within the fiberoptic cable 140 (e.g., in accordance with Brillouin scattering illustrated by FIG. 3B). As illustrated, the frequency of Stokes (e.g., at a wavelength λ of about 1499.9 nm) and Anti-stokes (e.g., at a wavelength λ of about 1550.1 nm) peaks varies (e.g., linearly) with the varying temperature and strain caused by the conduit system 120 (or the temperature control element 130).

The controller 180 then analyzes the light output from the fiberoptic cable 140. The controller 180 transforms the varied light output into incident temperature output at the locations/area/sections of the conduit system 120 throughout its length, as illustrated by FIG. 3C as a non-limiting example. For example, across a zone 1 (first location 150a) of the conduit system 120, the controller may determine a temperature plot T1 (e.g., with a maximum crest of about 37.5° C. and a minimum trough of about 31.5° C.). Next, at an adjacent zone 2 (second location 150b) of the conduit system 120, the controller may determine a temperature plot T2 (e.g., with a maximum crest of about 38.5° C. and a minimum trough of about 37° C.). Next, at an adjacent zone 3 (second location 150c) of the conduit system 120, the controller may determine a temperature plot T3 (e.g., with a maximum crest of about 46.5° C. and a minimum trough of about 33° C.). Next, at an adjacent zone 4 (second location 150d at a critical zone) of the conduit system 120, the controller may determine a temperature plot T4 (e.g., with a maximum crest of about 48.5° C. and a minimum trough of about 37° C.). Next, at an adjacent zone 5 (second location 150e) of the conduit system 120, the controller may determine a temperature plot T5 (e.g., with a maximum crest of about 40.5° C. and a minimum trough of about 27° C.). In some embodiments, one zone may be a control zone in which the temperature of the fluid in the conduit 120 is known, such that the control zone may be utilized in order to determine the accuracy of the temperature monitoring system 110.

In this manner, the controller 180 may determine whether the temperature at a particular zone or location 150 is within the required threshold range associated with that zone. The controller 180 periodically or continually monitors the process temperature along the entire conduit system 120 to ensure that process temperatures (or temperature control element 130 to ensure that heat transfer fluid temperatures) are maintained at the required levels. The controller 180 may transmit alerts, periodically and/or in real time, in response to determining that the temperature at one or more locations does not meet the temperature threshold for the particular location. The controller 180 may also transmit control signals to appropriate temperature control elements 130 (e.g., tracer tubes, steam heating pipes, electric heaters, jacketed pipe, heat exchangers, etc.) to regulate temperature of the conduit system 120. The controller 180 may also identify zones/locations 150 where plugging is imminent (e.g., due to compromise of insulation at the zone/location, or other potential causes).

Moreover, as illustrated by Detail A-A of FIG. 2, in some embodiments, the fiberoptic cable 140 may comprise an optical fiber 140(i) (e.g., a glass fiber) encased by a sheath 140(ii) or encasement (e.g., a stainless steel tube, or the like). In some embodiments, the optical fiber 140(i) may comprise an approximate 50/125 μm graded index. In some embodiments, the sheath 140(ii) may comprise an outer diameter of about 1.5 mm to 2.2 mm. The sheath 140(ii) may be surrounded by one or more wires 140(iii) (e.g., 12 wires), such as stranded stainless steel wires or polyimide coated stainless steel wires configured for high temperature applications. In some embodiments, the one or more wires 140(iii) may comprise a diameter of about 0.5 mm to 0.7 mm. The overall outer diameter of the fiberoptic cable 140 may be in the range of about 2.5 mm to 3.5 mm. The sheath 140(ii) or encasement may be sized to allow for expansion and contraction of the optical fiber 140(i).

The fiberoptic cable 140 is structured to be coupled to not only the conduit system 120, but also to conduit structures located along the conduit system 120 such as bends, flanges, projections, etc., (or element structures of the temperature control element 130) each having varied cross-sections, shapes, orientation, geometry, operating conditions, operation functions, and/or the like. In this regard, the fiberoptic cable 140 may be bent, without causing fracture, creep, or blocking of transmission of light therethrough, for a minimum bending radius of about 50 mm to 90 mm. Specifically, the fiberoptic cable 140 may be bent to a minimum radius of about 60 mm in the absence of tensile loading, and to a minimum radius of about 80 mm in the presence of tensile loading. Moreover, the fiberoptic cable 140 is structured to withstand the mechanical stresses and strains, and temperature conditions caused by the conduit system 120 and its conduit structures. In this regard, the fiberoptic cable 140 may be structured to withstand maximum tensile strengths in the range of 1100 N to 2000 N. The fiberoptic cable 140 may be structured to withstand operating temperatures in the range of about −40° C. to 300° C., and installation temperatures in the range of about −5° C. to 50° C.

It should be understood that while some specific sizes, configurations, and performance of the fiberoptic cable 140 are described herein, any type of fiberoptic cable 140 may be utilized such that the fiberoptic cable 140 may be of any size, have any configuration, and/or provide any type of performance for the implementation of the fiberoptic cable 140 described herein.

Figure 4:
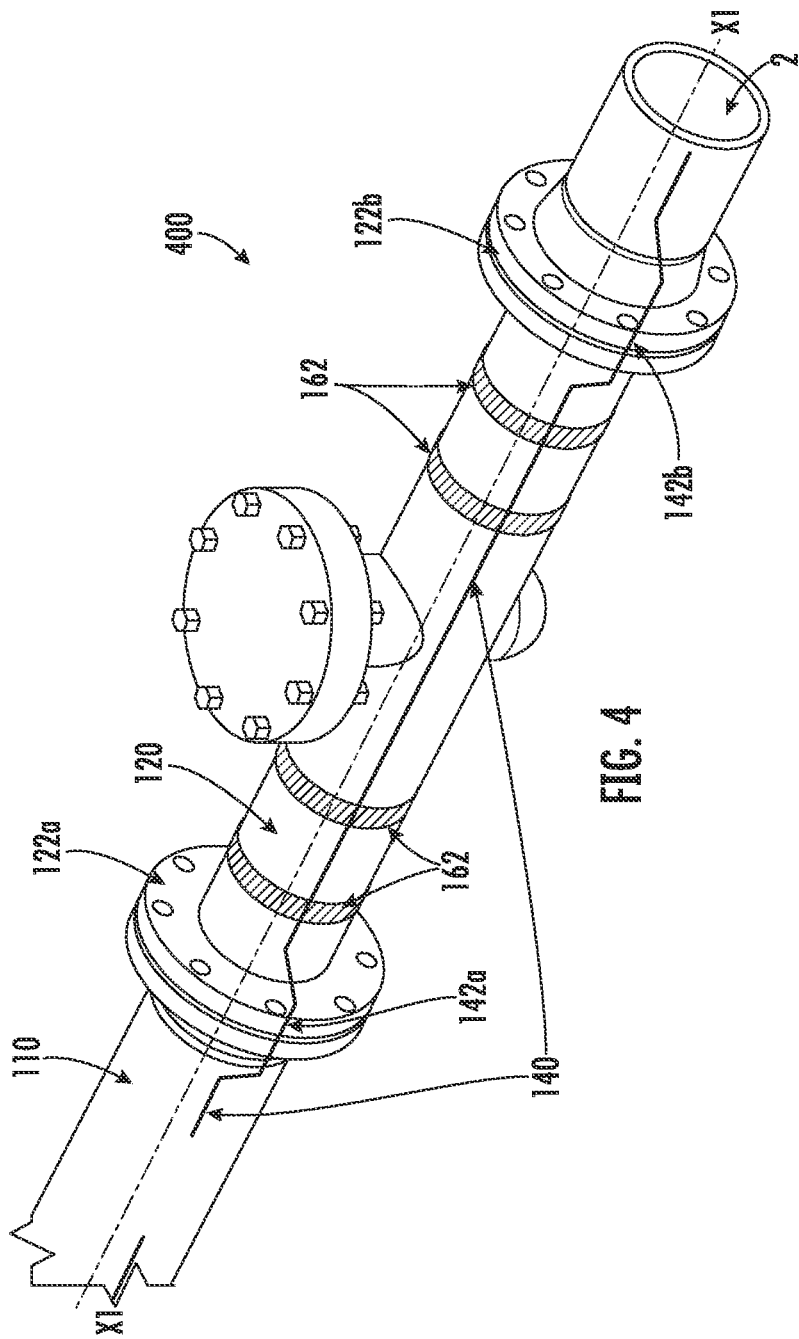
FIG. 4 illustrates a perspective sectional view 400 of the temperature monitoring system 110, in accordance with some embodiments of the disclosure.

The assembly of the fiberoptic cable 140 with various portions of the conduit system 120, will now be described with reference to FIGS. 4-8. FIG. 4 illustrates a perspective sectional view 400 of the temperature monitoring system 110, in accordance with some embodiments of the invention. FIG. 4 illustrates a section of the conduit 120 transporting fluid 2 and having and axis X1-X1 along its length (e.g., a longest dimension). Moreover, the conduit 120 comprises conduit structures comprising one or more flanges (122a, 122b). A fiberoptic cable 140 is operatively coupled to an outer surface of the conduit 120, as illustrated, along the conduit body in-line with its longest dimension. Specifically, a first section 142a of the fiberoptic cable 140 is deformed to substantially conform to the contour of the adjacent flange 122a. Similarly, a second section 142b of the fiberoptic cable 140 is deformed to substantially conform to the contour of the adjacent flange 122b. As such, the fiberoptic cable 140 may be substantially parallel to the axis X1-X1 of the conduit 120. Moreover, one or more bandings 162 (or other type of connection, such as clamps, adhesive, fasteners, or the like) may be employed to secure the fiberoptic cable 140 against the conduit 120.

Figure 5:
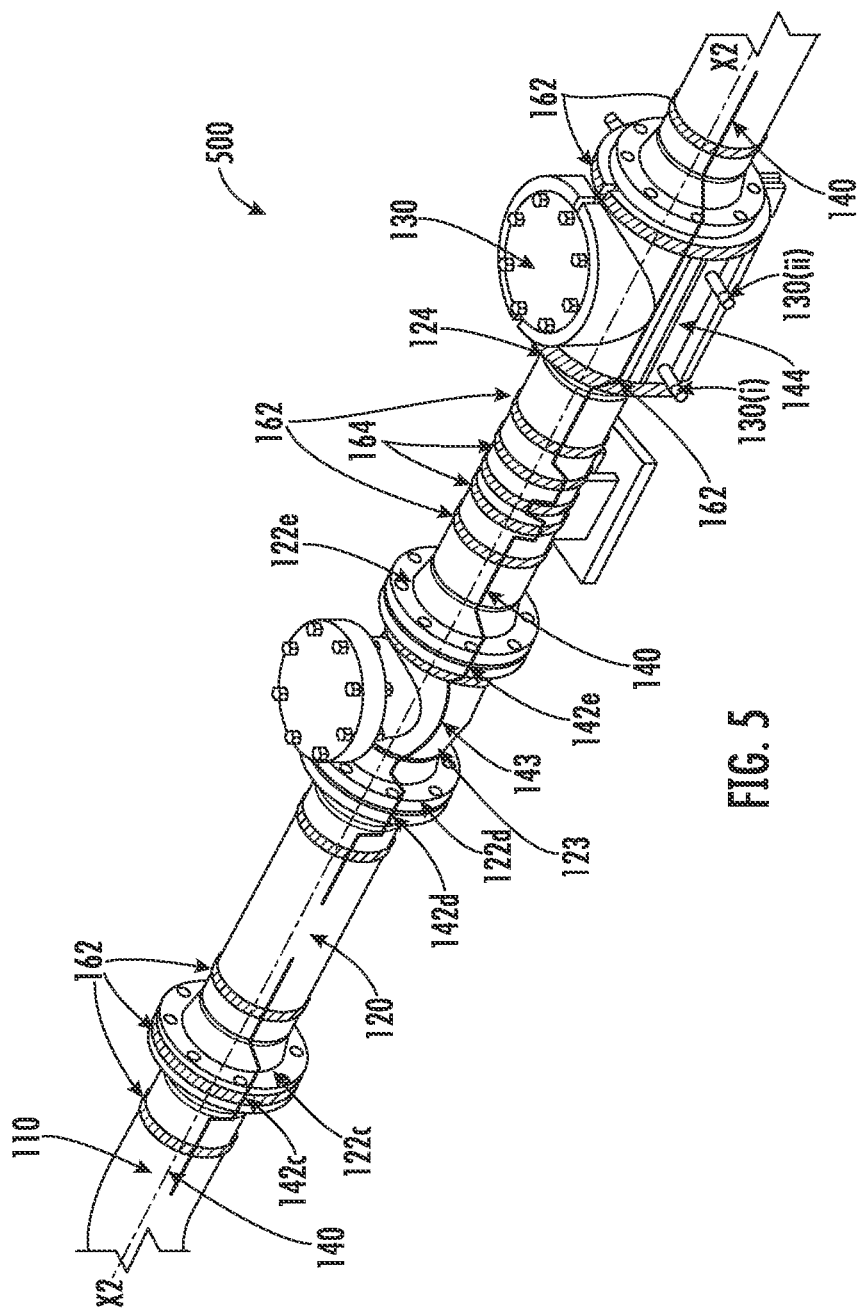
FIG. 5 illustrates a perspective sectional view 500 of the temperature monitoring system 110, in accordance with some embodiments of the disclosure.

FIG. 5 illustrates a perspective sectional view 500 of the temperature monitoring system 110, in accordance with some embodiments of the invention. FIG. 5 illustrates a section of the conduit 120 having an axis X2-X2 along its length (e.g., a longest dimension). Moreover, the conduit 120 comprises conduit structures comprising one or more flanges (122c-122e), one or more valves 123, and a temperature control element 130 (e.g., in the form of a jacketed pipe configuration). The temperature control element 130 may comprise a control conduit (e.g., an annular channel/ jacket) surrounding a portion of the outer surface of the conduit 120, having an inlet 130(i) and an outlet 130(ii). The temperature control element 130 may comprise control fluid (such as air, steam, water, oil, and/or the like) within the control conduit. The control fluid may comprise a greater temperature than that of the conduit fluid (e.g., process fluid) within conduit 120 (e.g., in order to heat the conduit fluid therein). Alternatively, the control fluid may comprise a lesser temperature than that of the conduit fluid (e.g., process fluid) within conduit 120, e.g., in order to cool the fluid therein. A fiberoptic cable 140 is operatively coupled to an outer surface of the conduit 120, as illustrated, along the conduit body in-line with its longest dimension. Specifically, sections 142c-142e of the fiberoptic cable 140 are deformed to substantially conform to the contours of the adjacent flanges 122c-122e, respectively. Similarly, another portion 143 of the fiberoptic cable 140 may be deformed to conform to the contour of the outer surface of the valve 123, as illustrated. Yet another portion 144 of the fiberoptic cable 140 may be deformed to conform to the contour of the outer surface of the temperature control element 130, as illustrated. As such, the fiberoptic cable 140 may be substantially parallel to the axis X2-X2 of the conduit 120. Moreover, one or more bandings 162, or other connectors, may be employed to secure the fiberoptic cable 140 against the conduit 120. In addition, one or more clamp supports 164, or other connectors, may be provided to further secure the fiberoptic cable 140 against the conduit 120.

Figure 6A:
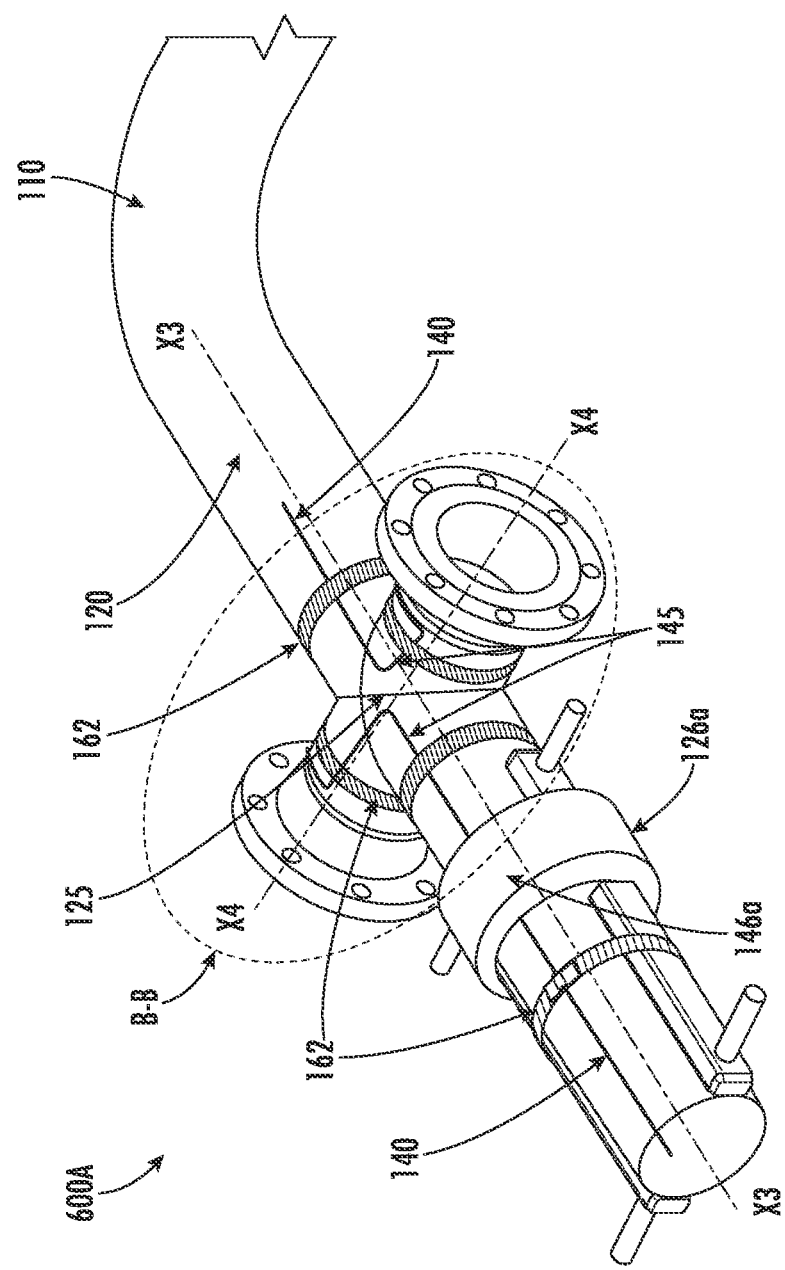
FIG. 6A illustrates a perspective sectional view 600A of the temperature monitoring system 110, in accordance with some embodiments of the disclosure.

FIG. 6A illustrates a perspective sectional view 600A of the temperature monitoring system 110, in accordance with some embodiments of the invention. FIG. 6B illustrates a detail sectional view 600B of the temperature monitoring system 110 of FIG. 6B. As illustrated, the conduit 120 may comprise an axis X3-X3 along its length (e.g., a longest dimension). Moreover, the conduit 120 comprises conduit structures comprising a pipe junction 125 formed by one or more branches (125(iii), 125(iv)) at an axis X4-X4 (e.g., substantially transverse to axis X3-X3), and an insulation component 126a provided over an outer surface of the conduit 120. A fiberoptic cable 140 is operatively coupled to an outer surface of the conduit 120, as illustrated. Specifically, a portion 145(*i*) of the fiberoptic cable 140 is coupled along the main pipe portion 125(*i*), substantially parallel to the axis X3-X3, as depicted. The following portion 145(*iv*) of the fiberoptic cable 140 is conformed around the branch 125(*iv*), beginning in a direction along the axis X4-X4 (transverse to the main pipe portion 125(*i*)), and then going around the outer surface of the branch 125(*iv*), to reach the opposite branch 125(*iii*) from the opposite side. Here, a portion 145(*iii*) of the fiberoptic cable 140 conforms around the outer surface of the branch 125(*iv*) and emerges in a direction substantially parallel to the axis X4-X4. Finally, the following portion 145(*ii*) is coupled to the main pipe portion 125(*ii*) in a direction substantially parallel to the axis X3-X3. In this manner, all of the branches (125(*iii*), 125(*iv*)) and the main pipe portions (125(*i*), 125(*ii*)) of the junction 125 may be coupled with a single contiguous fiberoptic cable 140, and temperatures across all of the junction may be monitored. Alternatively, different fiber optic cables 140 may be utilized around a conduit structure in order to determine the temperature of the conduit fluid at different locations within the conduit structure.

Moreover, as illustrated in FIG. 6A at least a portion 146a of the fiberoptic cable 140 may be operatively coupled to the conduit 120 at its outer surface, underneath the insulation component 126a, substantially parallel to the axis X3-X3 of the conduit 120. Moreover, one or more bandings 162 (e.g., retainers) or other connectors, may be employed to secure the fiberoptic cable 140 against the conduit 120.

Figure 7:
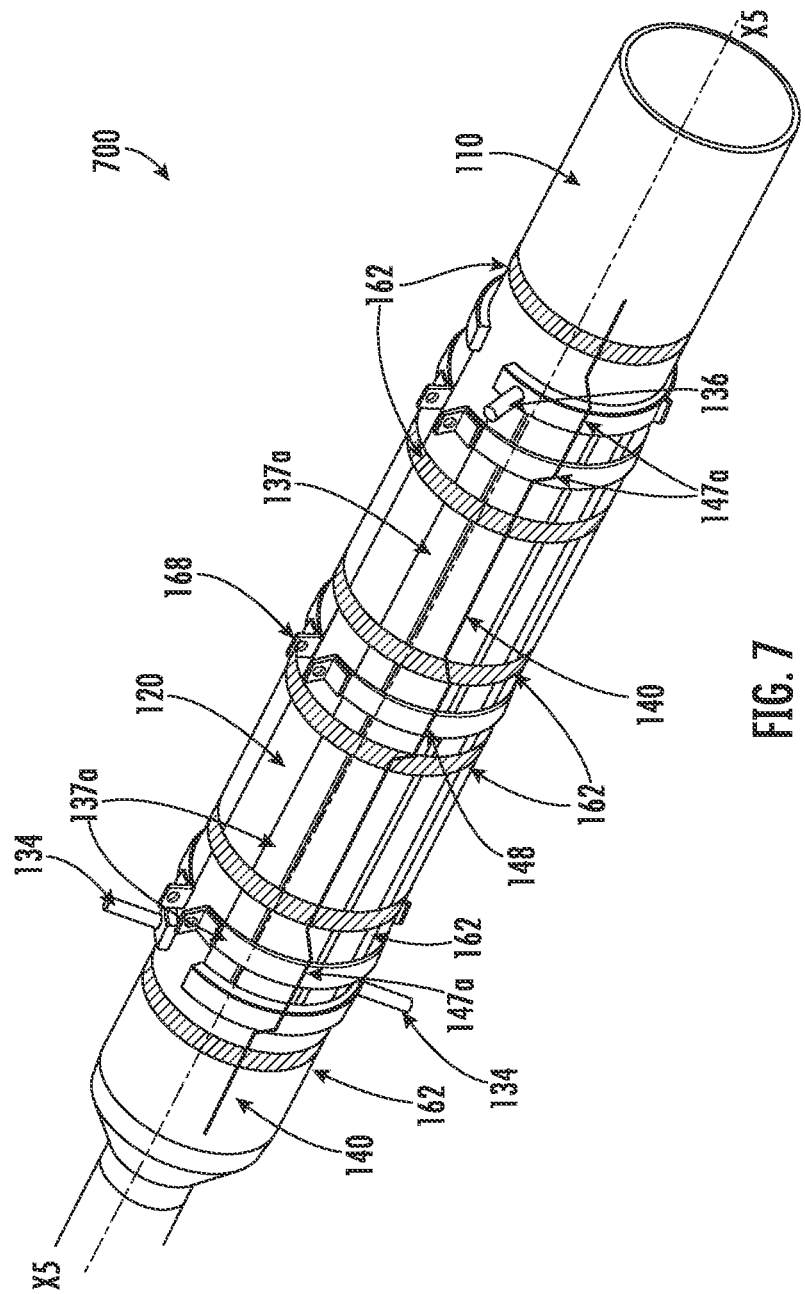
FIG. 7 illustrates a perspective sectional view 700 of the temperature monitoring system 110, in accordance with some embodiments of the disclosure.

FIG. 7 illustrates a perspective sectional view 700 of the temperature monitoring system 110, in accordance with some embodiments of the invention. FIG. 7 illustrates a section of the conduit 120 having an axis X5-X5 along its length (e.g., a longest dimension). Moreover, the conduit 120 comprises one or more temperature control elements 130 in the form of one or more tracer tubes 137a. The one or more tracer tubes 137a may comprise a control conduit (e.g., tracer tubes, heat exchangers, etc.) surrounding a portion of the outer surface of the conduit 120, having one or more inlets 134 and one or more outlets 136. The one or more tracer tubes 137a may comprise control fluid (such as air, steam, water, oil, and/or the like) within the control conduit. The control fluid may comprise a greater temperature than that of the conduit fluid (e.g., process fluid) within conduit 120 (e.g., in order to heat the conduit fluid therein). Alternatively, the control fluid may comprise a lesser temperature than that of the conduit fluid (e.g., process fluid) within conduit 120 (e.g., in order to cool the conduit fluid therein). A fiberoptic cable 140 is operatively coupled to an outer surface of the conduit 120, as illustrated, along the conduit body in-line with its longest dimension. In some embodiments, the fiberoptic cable 140 may be located equal distance between two temperature control elements 130 (e.g., tracer tubes 137a, or the like) in order to more accurately determine the temperature of the conduit fluid within the conduit 120 (e.g., determine an average temperature of the conduit fluid). Sections 147a of the fiberoptic cable 140 are deformed to substantially conform to the contours of the adjacent tracer tubes 137a (e.g., in a direction substantially parallel to the axis X5-X5 of the conduit 120). Moreover, one or more bandings 162 may be employed to secure the fiberoptic cable 140 against the conduit 120. In addition, one or more pipe supports 168 (e.g., hangers) may be provided.

Figure 8:
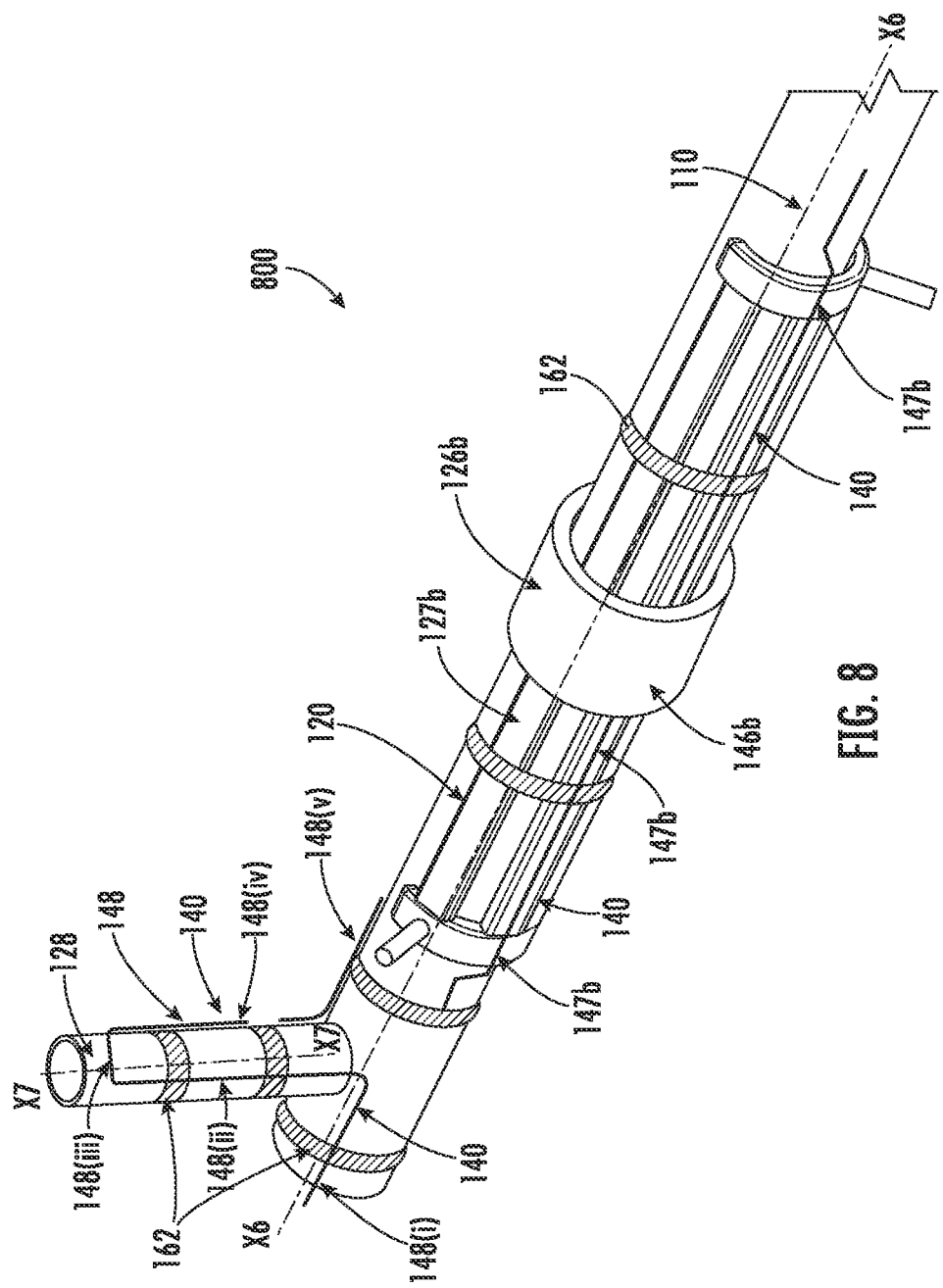
FIG. 8 illustrates a perspective sectional view 800 of the temperature monitoring system 110, in accordance with some embodiments of the disclosure.

FIG. 8 illustrates a perspective sectional view 800 of the temperature monitoring system 110, in accordance with some embodiments of the invention. As illustrated, the conduit 120 may comprise an axis X6-X6 along its length (e.g., a longest dimension). Moreover, the conduit 120 comprises conduit structures comprising a pipe branch 128 having at an axis X7-X7 (e.g., substantially transverse to axis X6-X6), one or more temperature control elements 130 in the form of one or more tracer tubes 137b, and an insulation component 126b provided over an outer surface of the conduit 120 and over the tracer tubes 137b. It should be understood that the insulation component 126b is illustrated as being located over only a small portion of the conduit 120, temperature control element 130, and fiberoptic cable 140; however, this is done to illustrate the conduit 120, temperature control element 130, and fiberoptic cable 140. As such, it should be understood that the insulation component 126b may extend over the conduit 120, temperature control element 130, and/or fiberoptic cable 140 over any length thereof (e.g., the entire length thereof, or the like). A fiberoptic cable 140 is operatively coupled to an outer surface of the temperature control element 130, as illustrated. Specifically, a portion 148(*i*) of the fiberoptic cable 140 is coupled along the temperature control element 130, substantially parallel to the axis X6-X6, as depicted. The following portion 145(*ii*) of the fiberoptic cable 140 is conformed along the branch 128, in a direction along the axis X7-X7 (transverse to the axis X6-X6). The following portion 148(*iii*) is then positioned in a direction transverse to both the axis X6-X6 and the axis X7-X7. The following portion 148(*iv*) is then conformed along the branch 128, in a direction along the axis X7-X7. Finally, the following portion 148(*v*) is coupled to the conduit 120 in a direction substantially parallel to the axis X6-X6. In this manner, the fiber optic cable 140 may be used to determine temperatures of the conduit fluid in the conduit 120, of the control fluid in the temperature control element 130, and/or of the conduit fluid at the pipe branch 128 using a single contiguous fiberoptic cable 140. Alternatively, multiple fiberoptic cables 140 may be utilized to determine the temperature of fluids and/or components at different locations. Specifically, it should be understood that the fiber optic cable 140 may be utilized in order to determine the temperature of the temperature control element 130 (e.g., electric temperature control element) and/or a control fluid within a temperature control element 130 (e.g., tracer tube, or the like). In this way, the temperature of the temperature control element 130 that is utilized to heat or cold the conduit 120, and thus, the conduit fluid therein, may be more accurately monitored to determine any potential issues and/or more accurately controlled in order to provide the desired temperature control to the conduit 120, and thus, the conduit fluid therein.

Moreover, sections 147b of the fiberoptic cable 140 may be deformed to substantially conform to the contours of the adjacent tracer tubes 137b (e.g., in a direction substantially parallel to the axis X6-X6 of the conduit 120). Similarly, another portion 146b of the fiberoptic cable 140 may be coupled to the tracer tubes 137b at its outer surface, underneath the insulation component 126b, substantially parallel to the axis X6-X6 of the conduit 120. Moreover, one or more bandings 162 (e.g., retainers, or other connectors) may be employed to secure the fiberoptic cable 140 against the conduit 120.

Monitoring the conduit 120 and/or the temperature control element 130 may be performed individually, or at the same time, in order to adjust the operation of the system, such as the operation of the conduit fluid and/or the temperature control element 130 (e.g., the electrical temperature and/or control fluid therein). Consequently, in some embodiments monitoring both the conduit fluid temperature and the temperature control element 130 (e.g., the control fluid), allows the operator to adjust the operation of the system in order to achieve the desired operation of the system.

It should be understood that not only may the controller 180 be used to monitor the temperature of the conduit fluid of the conduit 120 and/or the operation of the temperature control element 130 (e.g., an electrical control, a control fluid, or the like) generally, but the controller 180 may also take into account and/or display in the output the conduit structures and/or the element structures (e.g., flanges, valves, conduit intersections, or the like). As such, the controller 180 may clarify in the output, the locations of the conduit structures and/or element structures to take into account specific temperature readings at these locations. The specific temperature readings at these locations may provide additional insight into the operation of the process (e.g., process fluid, or the like) to allow for adjustments to the process. Moreover, the locations of the connectors (e.g., bandings and/or other connections) may be taken into account in order to account for any temperature readings at these locations due to the connection methods. For example, the controller 180 may be used to adjust the temperature readings at locations where the conduit structures and/or element structures, and/or connection are made in order to provide more accurate readings.

Figure 9:
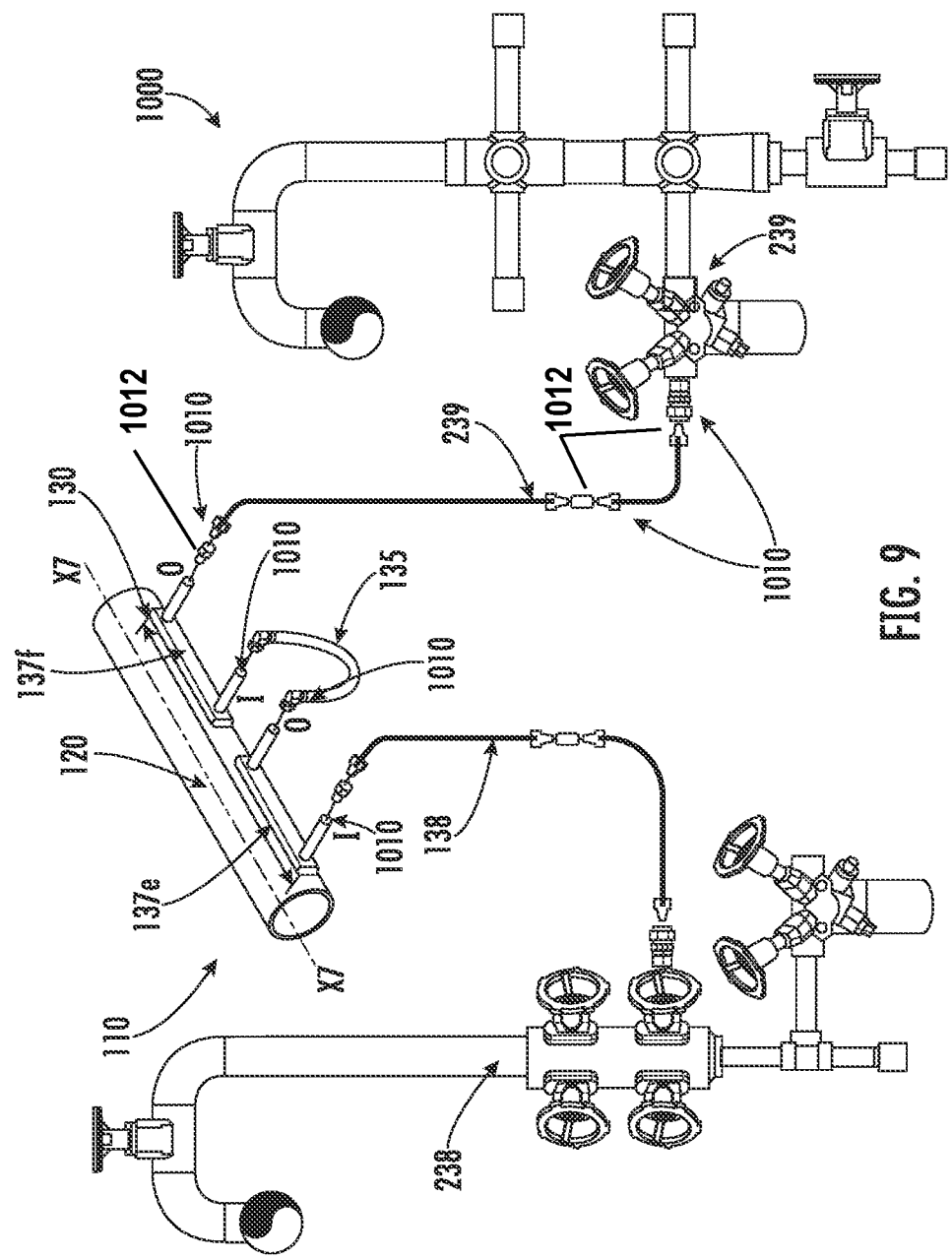
FIG. 9 illustrates a perspective view 1000 of the temperature monitoring system 110, in accordance with some embodiments of the disclosure.
Figure 10:
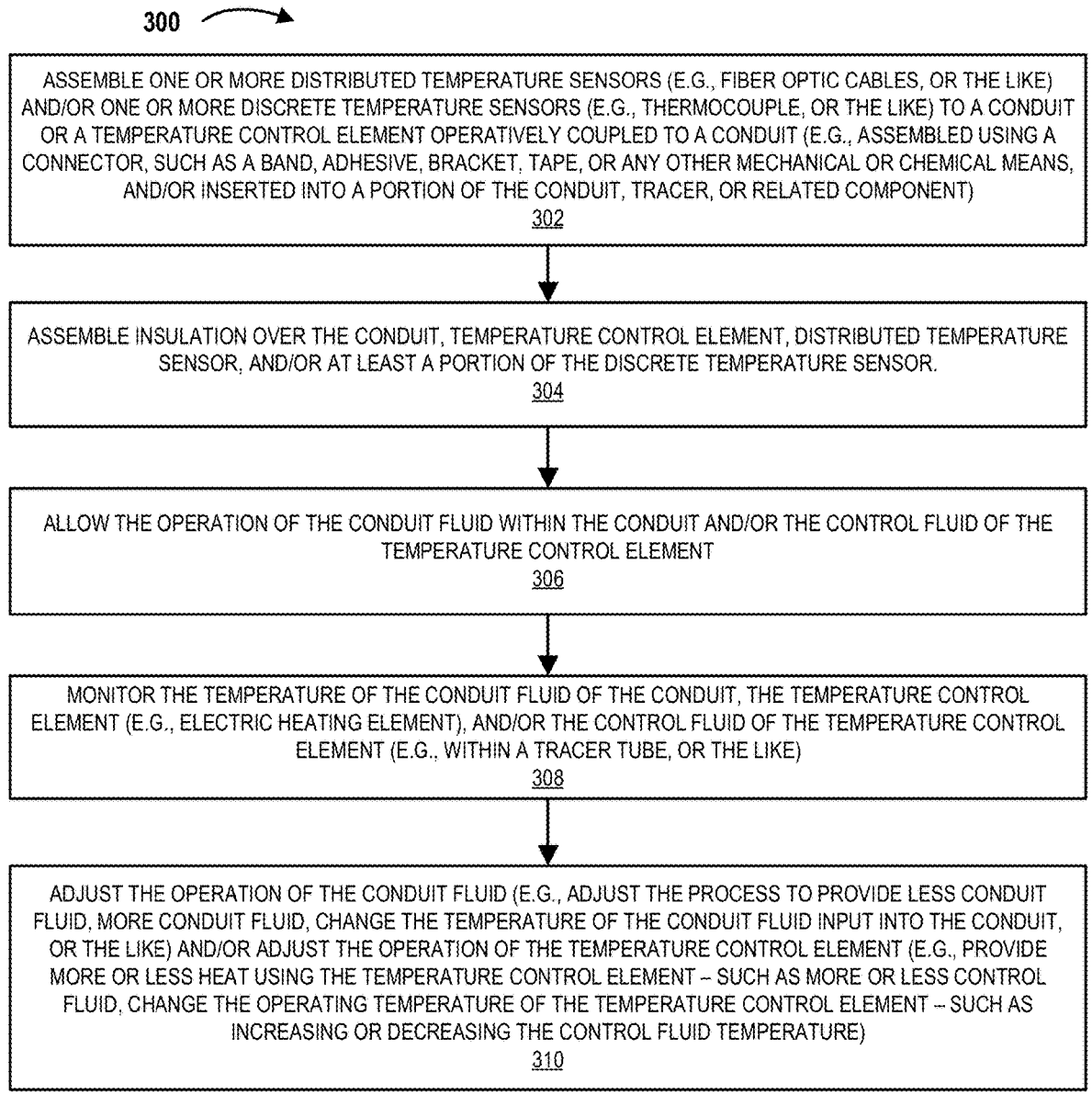
FIG. 10 illustrates an installation and operation process for installing and using the temperature monitoring system 110, in accordance with some embodiments of the disclosure.

FIG. 9 illustrates a perspective view 1000 of another embodiment of the temperature monitoring system 110, in accordance with some embodiments of the invention. Specifically, FIG. 10 illustrates a section of the conduit 120 transporting conduit fluid 2 and having and axis X7-X7 along its length (e.g., a longest dimension). As previously described herein with respect to other embodiments of the invention, the conduit 120 is operatively coupled to one or more temperature control elements 130, such as in the form of one or more tracer tubes 137e, 137f. Although not illustrated in FIG. 9, one or more insulation components may be provided over an outer surface of the conduit 120 and/or over the tracer tubes 137e, 137f. It should be understood that the tracer tubes 137e, 137f may extend over the conduit 120 over any length thereof (e.g., the entire length thereof, a portion of the length thereof, or the like) as previously described herein. The tracer tubes 137e, 137f are typically structured for transporting a control fluid therein from an inlet "I" to an outlet "O". The control fluid may comprise steam, or any other suitable fluid, as previously discussed herein. Typically, the control fluid is heated to (or cooled to) a predetermined temperature and provided at the inlet of a tracer tube 137e, 137f. As previously described herein, as the control fluid flows within the tracer tube 137e, 137f, the control fluid (e.g., tracer fluid, or the like) regulates the conduit fluid (e.g., a process fluid) within the conduit 120 to the desired temperature or temperature range, due to heat transfer between the tracer tube 137e, 137f and the conduit 120. In this manner, the temperature of the conduit fluid within the conduit may be controlled, stabilized or otherwise manipulated by modifying the temperature of the control fluid in the tracer tube 137e, 137f.

In order to determine the accuracy of the temperature of the conduit fluid or the control fluid, one or more discrete temperature sensors 1010 may be utilized in place of, or in addition to, the distributed temperature sensors 140 (e.g., fiber optic cables 140, or the like) of the temperature monitoring system 110 previously described herein. In some embodiments of the invention, the one or more discrete temperature sensors 1010 may be provided at or adjacent the inlet "I" of the tracer tubes 137e, 137f, at the supply lines 138 providing the control fluid to the tracer tubes 137e, 137f, and/or at a supply manifold 238 used to supply the control fluid to the supply lines 138. Moreover, the one or more discrete temperature sensors 1010 may be located within the jumper lines 135 located between tracer tubes 137e, 137f.

Alternatively, or additionally, the one or more discrete temperature sensors 1010 may be located at an outlet "O" of the one or more tracer tubes 137e, 137f, at the outlet lines 139 returning the control fluid to a return manifold 239, and/or at the return manifold 239. For example, the return manifold 239 may return the control fluid to a supply unit where it may be reheated for additional use and supplied to the supply manifold 238, or the other supply components described herein. It should be understood that the one or more discrete temperature sensors 1010 may only be needed adjacent an outlet of the one or more tracer tubes 137e, 137f, at the outlet lines 139, and/or at the return manifold 239 since if the temperature reading of the control fluid at a downstream location is at the desired temperature, then the temperature of control fluid upstream of the discrete temperature sensor is likely at the desired temperature.

While the use of one or more discrete temperature sensors 1010 are described herein as being operatively coupled to the temperature control elements 130, such as the tracer tubes 137e, 137f, the supply manifold 238, the supply lines 138, the jumper lines 135, the outlet lines 139, and/or the outlet manifold 239, it should be understood that the one or more discrete temperature sensors 1010 may be utilized with any type of system that utilizes a fluid heating medium, such as a jacketed conduit system, or other like system.

In other embodiments, the one or more discrete temperature sensors 1010 may be operatively coupled to the outer surface of the conduit 120, an inlet or outlet of the conduit 120, to an instrumentation location coupled to the conduit 120, or the like (e.g., instead of one or the temperature control elements 130). Regardless of whether or not the one or more discrete temperature sensors 1010 are operatively coupled to a part of the conduit 120, the temperature control elements 130, or the like, the one or more discrete temperature sensors 1010 may be a surface sensor (e.g., that contacts a surface of a component) or an insertion sensor (e.g., that is inserted into a component with the probe inserted into the fluid).

The one or more discrete temperature sensors 1010 may be operatively coupled within any type of fitting 1010 used in the conduit pipe 120, the supply manifold 238, the supply tubes 138, the tracer tubes 137e, 137f, jumper tubes 135 (e.g., between tracer tubes 137e, 137f, or the like), the outlet tubes 139, the outlet manifold 239, or the like. For example, the fitting 1010 may be located between any of the forgoing or may be located in-line within any of the forgoing (e.g., discrete temperature sensor fittings located in-line specifically to take temperature readings at the desired location). The fittings may be JIC fittings, compression fittings, NPT fittings, or any other type of fitting any in any type of shape (e.g., elbow, tee, y-type, in-line, or the like) used with the tracer tubes 137e, 137f, or any of the associated components.

The one or more discrete temperature sensors 1010 may comprise any type of discrete temperature sensor, such as a bi-metallic, expanding fluid, thermocouple, resistance temperature detector (RTD), infrared, or other like discrete temperature sensor. It should be further understood that the one or more discrete temperature sensors may include a gauge from which a user may read a temperature at the location of the discrete temperature sensor 1010. In other embodiments, the one or more discrete temperature sensors 1010 may communicate electronically to display the temperature(s) at the one or more discrete locations locally or remotely to a user away from the one or more discrete locations. For example, the one or more discrete temperature sensors 1010 may comprise a communication component (e.g., wired connection, wireless connection, or the like) to provide the temperature readings to the temperature monitoring system 110, or controller 180 thereof, as previously described herein with respect to the use of fiber optic cables 140. It should be understood, that the one or more discrete temperature sensors 1010 and/or the one or more distributed temperature sensors described herein may be operatively coupled to any communication component 182 that can communicate in a wired or wireless way with the controller 180 of the temperature monitoring system 110.

It should be further understood that the one or more discrete temperature sensors 1010 may be used alone in place of the distributed temperature sensors 140 (e.g., the fiber optic cables 140, or the like previously described herein), or along with the distributed temperature sensors (e.g., the fiber optic cables 140, or the like previously described herein) in order to provide multiple methods for determining the temperature of the control fluids and/or conduit fluids. Regardless of how the temperatures are determined (e.g., distributed temperature sensors 140, one or more discrete temperature sensors 1010, combinations thereof, or the like), the temperature monitoring system 110, such as the controller therein 180, may be utilized to monitor the conduit fluid and/or the control fluid, and in some embodiments to take actions with respect to the conduit fluid system and/or the control fluid system (e.g., changing the process, process temperatures, or the like).

It should be understood that the one or more discrete temperature sensors 1010 (e.g., bi metallic, expanding fluid, thermocouple, resistance temperature detector (RTD), infrared, or the like), the distributed temperature sensors 140 (e.g., the fiber optic cables 140, or the like) or other like temperature determination devices may be described generally as temperature sensors. Consequently, wherever the distributed temperature sensors (e.g., the fiber optic cables 140, or the like) are discussed herein, it should be understood that the description of the distributed temperature sensors 140 may be replaced by the discrete temperature sensors 1010, and the temperature monitoring system 110 may operate in the same or similar way, or vice versa. Alternatively, wherever the distributed temperature sensors (e.g., the fiber optic cables 140) and/or the discrete temperature sensors 1010 are discussed herein, it should be understood that either may be replaced by the general term temperature sensor, and the temperature monitoring system 110 may operate in the same or similar way.

FIG. 10 illustrates an installation and operation process 300 for installing and using the temperature monitoring system 110 described herein. As illustrated by block 302 of FIG. 10, a user (e.g., installer) may assemble one or more distributed temperature sensors (e.g., fiber optic cables 140, or the like) and/or the one or more discrete temperature sensors 1010 to a conduit 120 and/or a temperature control element 130. For example, one or more distributed temperature sensors (e.g., fiber optic cables 140, or the like) and/or one or more discrete temperature sensors 1010 may be assembled directly to a conduit 120 and/or conduit structures thereof, in order to measure the temperature of the conduit fluid (e.g., process fluid) within the conduit periodically and/or continuously during operation of the conduit fluid in the conduit 120. Alternatively, or additionally, one or more distributed temperature sensors (e.g., fiber optic cables 140, or the like) and/or one or more discrete temperature sensors 1010 may be operatively coupled to the temperature control element 130 (e.g., tracer tubes, or the like) in order to measure the temperature of the temperature control element 130 (e.g., electric heating element) or the control fluid of the temperature control element 130 (e.g., tracer tubes). The one or more distributed temperature sensors (e.g., fiber optic cables 140, or the like) and/or one or more discrete temperature sensors 1010 may be operatively coupled to the conduit 120 and/or the temperature control element 130 utilizing one or more connectors. The one or more connectors may comprise adhesive (e.g., glue, epoxy, or the like), a band (e.g., elastic, metal, plastic, or the like), tape, bracket (e.g., tab, flange, or the like), or any other mechanical or chemical connection between the fiber optic cables 140 and/or one or more discrete temperature sensors 1010 and the conduit 120 and/or the temperature control element 130. In some embodiments, with respect to the one or more discrete temperature sensors 1010, a portion of the discrete temperature sensors may be inserted into the fluid (e.g., the conduit fluid, the control fluid, a cavity through which the fluids move, or the like).

Block 304 of FIG. 9 further illustrates that insulation may be assembled over the conduit 120, the temperature control element 130, the distributed temperature sensors (e.g., fiber optic cable 140), and/or at least a portion of the one or more discrete temperature sensors 1010. It should be understood that the insulation may be utilized to aid in preventing thermal loss (e.g., heat loss, cold loss, or the like) from the conduit 120 and/or temperature control element 130 (or structures thereof).

FIG. 10 further illustrates in block 306 that the operation of a facility may include allowing conduit fluid to flow through the conduit 120, and additionally, in some embodiments to allow operation of a temperature control element 130 (e.g., allow electric heating or allow control fluid to flow). That is, for example, process fluid may be passed through the conduit 120 and conduit fluid (e.g., steam, or the like) may be passed through the temperature control element 130 (e.g., tracer tube, or the like). The control fluid, in some embodiments, may be utilized to control (e.g., maintain, increase, decrease, or the like) the temperature of the conduit fluid passing through the conduit 120.

Block 308 of FIG. 10 further illustrates that the temperature monitoring system 110, such as the controller 180, the one or more distributed temperature sensors (e.g., fiber optic cables 140), and/or the one or more discrete temperature sensors 1010 may be used to monitor the temperature of the conduit fluid of the conduit 120 and/or the temperature control element 130 (e.g., the control fluid thereof). For example, as described herein the controller 180, the one or more distributed temperature sensors (e.g., fiber optic cables 140), and/or the one or more discrete temperature sensors 1010 may be used to determine the temperature at different locations along the conduit 120 and/or the temperature control element 130 attached thereto, as previously described herein. In some embodiments the process fluid may include liquid sulfur and/or the control fluid may include steam. The steam may be utilized in order to maintain the liquid sulfur in a liquid form in order to prevent solidification (e.g., partial or complete) of the liquid sulfur into a solid form should the liquid sulfur temperature drop below a phase change temperature.

In some embodiments, the monitoring of the temperature of the conduit fluid and/or the control fluid may be utilized in order to operate the facility, such as by comparing the temperature(s) of the conduit (or structures thereof), the conduit fluid, the temperature control system (or structures thereof), the control fluid, or the like to stored threshold temperatures for any of the foregoing. For example, should locations along conduit 120 illustrate temperatures below the desired conduit fluid temperature, the temperature readings may require that the flow of the conduit fluid be increased, a temperature adjustment (e.g., increased the temperature of the control fluid), cleaning of the conduit 120 at the specified location, re-routing of the conduit 120, additional insulation for the conduit 120, additional temperature control elements 130 at the location (e.g., additional tracer tubing, or the like), or other like responses to monitoring the temperature of the conduit fluid. Alternatively, or additionally, monitoring the temperature control element 130 may result in the adjustment of the control fluid and/or the temperature control element 130 itself. For example, more or less heat may be provided by adjusting the flow and/or temperature of the control fluid, a portion of the temperature control element 130 may be removed or added to particular locations of the conduit 120, the size of the temperature control element 130 may be adjusted, nozzles (e.g., diverging and/or converging nozzles) may be added and/or adjusted in order to control the flow of control fluid, insulation may be added or removed from a particular location, or the like may be performed in order to change the temperature of the control fluid, and thus, the conduit fluid at particular adjacent locations.

It should be understood that the adjustments to the conduit 120 and/or temperature control element 130 may be made manually after reviewing the output described herein, or automatically, through the use of the controller 180 or another device. As such, the temperature monitoring system 110 provides improved operation of the facility, and in particular, the conduit fluid (e.g., process fluid) and/or the control fluid (e.g., the tracer tube steam) utilized within the facility.

The present invention provides technical improvement over conventional systems because the present invention is configured for: (i) temperature measurement, monitoring and control of the conduit fluid in the conduit and/or the control fluid of temperature control element, and (ii) temperature measurement, monitoring and/or control at and/or around conduit structures of the conduit, and/or element structures of the temperature control element.

The disclosure of the present invention provides improvements in various applications of the temperature monitoring system 110. It should be understood that conduit systems 120 are widely used for innumerable functions, such as, for example, transporting water, oil, chemicals, liquid sulfur, or other fluids. It is often desirable to maintain a fluid transported via a conduit system 120 at a predetermined temperature or temperature range (e.g., above an ambient temperature of an environment in which the conduit is located, within a temperature range to prevent phase transformation of the fluid, or the like). The temperature monitoring system 110 allows for accurate determination of the temperature of fluids throughout the conduit system 120 and/or a temperature control element 130 used to maintain the temperature of the fluids in the conduit system 120.

With respect to some discrete temperature sensors, these types of sensors may only provide temperature measurements at particular points. As such, the inherent nature of some temperature sensors may limit the extent (e.g., length, area, volume, or the like) of temperature measurements. However, by placing the temperature sensors at particular locations, such as downstream of the temperature control elements 130 (e.g., the tracer tubes), the outlet temperatures of the control fluid and/or conduit fluid may be determined, which can be used to approximate the upstream temperature of the control fluid and/or conduit fluid (e.g., at an inlet to the temperature control elements 130, or the like). Moreover, placing multiple discrete temperature sensors at various locations in the temperature control elements 130 and/or the conduit system 120, and/or distributed temperature sensors (e.g., fiber optic cables 140) along portions of the temperature control elements 130 and/or the conduit system 120, the controller 180 or user thereof may determine locations within the system that do not have the desired conduit fluid temperature and/or control fluid temperature.

While multiple discrete temperature sensors 1010 (e.g., thermocouples, or the like as described herein) may be utilized in the temperature monitoring system 110, it should be understood that in order to achieve more accurate readings along the entire length of a conduit system 120 or temperature control system 130, the distributed temperature sensors (e.g., fiber optic cables 140, or the like) previously discussed herein may be utilized. Conduit systems 120 and/or temperature control systems 130 may comprise a variety of conduit structures such as bends, flanges, etc. Point temperature measurements made by local temperature sensors may not be able to accurately sample and/or measure temperatures at the various bends, flanges, conduit insulation, or other conduit structures. In some embodiments, measuring temperatures at such conduit structures using point temperature sensors, if possible, may lead to inaccurate results because of the variations in cross-section, shape, orientation, geometry, operating condition, operation functions, etc. of the conduit structures from the rest of the conduit 120. Consequently, using distributed temperature sensors (e.g., fiber optic cables 140, or the like) alone, or in combination with the discreate temperature sensors 1010, may allow the temperature monitoring system 110 to more accurately measure and monitor the temperature of fluids transported via a conduit 120 and/or a temperature control system 130, and also accurately measure and monitor temperatures at any conduit structures and/or temperature control element structures.

It should be understood that "operatively coupled," when used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more."

Certain terminology is used herein for convenience only and is not to be taken as a limiting, unless such terminology is specifically described herein for specific embodiments. For example, words such as "top", "bottom", "upper", "lower", "first", "second", or the like may merely describe the configurations shown in the Figures and described herein for some embodiments of the invention. Indeed, the components may be oriented in any direction and the terminology, therefore, should be understood as encompassing such variations unless specified otherwise. The terminology includes the words specifically mentioned above, derivatives thereof and words of similar import.

While the present invention has been particularly described, in conjunction with a specific embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A temperature monitoring system, the system comprising:
    a conduit having a length greater than a width, wherein the conduit is configured to transport a conduit fluid along the length of the conduit;
    a temperature control element operatively coupled to the conduit, wherein the temperature control element comprises a temperature control conduit, and wherein the temperature control conduit comprises control fluid of a temperature greater than or less than the conduit fluid of the conduit, wherein the temperature control element is configured to heat or cool the conduit fluid within the conduit; and
    one or more temperature sensors operatively coupled to the conduit or the temperature control element, wherein the one or more temperature sensors comprise at least one or more distributed temperature sensors comprising a fiber optic cable operatively coupled to the conduit or the temperature control element, and wherein the fiber optic cable is configured to capture temperature readings at one or more locations of the conduit or the temperature control element.

2. The temperature monitoring system of claim 1, wherein the one or more temperature sensors further comprise one or more discrete temperature sensors operatively coupled to one or more locations of the conduit.

3. The temperature monitoring system of claim 1, wherein the one or more temperature sensors further comprise one or more discrete temperature sensors operatively coupled to one or more locations of the temperature control element.

4. The temperature monitoring system of claim 3, wherein the one or more discrete temperature sensors are operatively coupled to a fitting at the one or more locations of the temperature control element.

5. The temperature monitoring system of claim 1, wherein when the fiber optic cable is operatively coupled to the conduit, the fiber optic cable is located on the conduit away from the temperature control conduit.

6. The temperature monitoring system of claim 1, wherein the fiber optic cable is operatively coupled to the conduit.

7. The temperature monitoring system of claim 1, wherein the fiber optic cable is operatively coupled to the temperature control element.

8. The temperature monitoring system of claim 1, wherein the conduit fluid comprises a process fluid that is being heated by the temperature control element.

9. The temperature monitoring system of claim 1, wherein the conduit, the temperature control element, and the one or more temperature sensors are at least partially covered by insulation.

10. The temperature monitoring system of claim 1, further comprising a controller operatively coupled to the one or more temperature sensors, wherein the controller comprises:
    one or more communication components;
    one or more memory components having computer readable code stored thereon; and
    one or more processing components operatively coupled to the one or more memory components and the one or more communication components, wherein the one or more processing components are configured to execute the computer readable code to:
        receive one or more signals from the one or more temperature sensors; and
        provide output through the one or more communication components regarding the one or more signals received from the one or more temperature sensors;
    wherein the output comprises at least one of the temperature readings.

11. The temperature monitoring system of claim 10, wherein the output comprises the temperature readings at the one or more locations of the conduit or the temperature control element.

12. The temperature monitoring system of claim 11, wherein the output is a visual representation of the conduit or the temperature control element with the temperature readings at the one or more locations of the conduit or the temperature control element.

13. The temperature monitoring system of claim 11, wherein the output is an alert indicating when the at least one of the temperature readings meets or fails to meet a threshold temperature value.

14. A method of monitoring a temperature of a conduit fluid or a control fluid, wherein the method comprises:
    receive a plurality of temperatures from a plurality of locations on a conduit or a temperature control element, wherein the temperature control element comprises a temperature control conduit having the control fluid of a temperature greater than or less than the conduit fluid of the conduit, wherein the plurality of temperatures are received from one or more temperature sensors operatively coupled to the conduit or the temperature control element, wherein the one or more temperature sensors comprise at least one or more distributed temperature sensors comprising a fiber optic cable operatively coupled to the conduit or the temperature control element to capture the plurality of temperatures, and wherein the plurality of temperatures received approximate a conduit fluid temperature or a control fluid temperature;
    compare the plurality of temperatures at the plurality of locations and stored threshold temperatures; and
    adjust operation of the conduit fluid or the control fluid based on the comparison of the plurality of temperatures at the plurality of locations with the stored threshold temperatures.

15. The method of claim 14, wherein when the fiber optic cable is operatively coupled to the conduit, the fiber optic cable is located on the conduit away from the temperature control conduit.

16. A temperature monitoring system, the system comprising:
    one or more temperature sensors configured to be operatively coupled with a conduit configured to transport a conduit fluid or to be operatively coupled with a temperature control element operatively coupled to the conduit, wherein the temperature control element comprises a temperature control conduit having control fluid of a temperature greater than or less than the conduit fluid of the conduit, wherein the one or more temperature sensors are configured to capture temperature readings at a plurality of locations along the conduit or the temperature control element, wherein the one or more temperature sensors comprise at least one or more distributed temperature sensors comprising a fiber optic cable operatively coupled to the conduit or the temperature control element to capture the temperature readings, wherein the conduit is configured to transport the conduit fluid along a length of the conduit, wherein the temperature control element is configured to heat or cool the conduit fluid within the conduit.

17. The temperature monitoring system of claim 16, wherein when the fiber optic cable is operatively coupled to the conduit, the fiber optic cable is located on the conduit away from the temperature control conduit.

* * * * *